United States Patent
Kai

(10) Patent No.: US 7,267,018 B2
(45) Date of Patent: Sep. 11, 2007

(54) STEERING LOCK SYSTEM INSPECTION DEVICE

(75) Inventor: Mitsuhiro Kai, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 244 days.

(21) Appl. No.: 11/176,003

(22) Filed: Jul. 6, 2005

(65) Prior Publication Data

US 2006/0021402 A1     Feb. 2, 2006

(30) Foreign Application Priority Data

Jul. 30, 2004   (JP)   .............................. 2004-223619

(51) Int. Cl.
   *G01M 19/00*   (2006.01)
   *B60R 25/02*   (2006.01)
(52) U.S. Cl. ..................... 73/865.8; 73/865.3; 70/252; 70/432; 70/446; 33/533; 33/550; 33/552; 701/29
(58) Field of Classification Search .................. 70/252, 70/446, 432; 73/865.3, 865.6, 865.8; 33/533, 33/550, 552, 542, 556, 568, 569, 572, 573, 33/549, 832, 8, 536; 701/29, 51, 41–44; 307/10.1–10.4
See application file for complete search history.

(56) References Cited

U.S. PATENT DOCUMENTS

| | | | | |
|---|---|---|---|---|
| 4,433,563 A | * | 2/1984 | Wilson | 70/446 |
| 4,679,447 A | * | 7/1987 | Sieradzki et al. | 73/865.8 |
| 4,905,490 A | * | 3/1990 | Wilson | 70/442 |
| 5,017,851 A | * | 5/1991 | Heinzman | 318/685 |
| 5,076,381 A | * | 12/1991 | Daido et al. | 180/446 |
| 5,460,058 A | * | 10/1995 | Shadoian | 73/865.8 |
| 5,602,450 A | * | 2/1997 | Cowan et al. | 318/265 |
| 6,041,887 A | * | 3/2000 | Kojo et al. | 180/446 |
| 6,380,642 B1 | * | 4/2002 | Buchner | 307/10.3 |
| 6,634,245 B1 | * | 10/2003 | Yoshioka et al. | 73/865.8 |
| 6,662,671 B1 | * | 12/2003 | Kopp et al. | 73/865.8 |
| 6,680,672 B2 | * | 1/2004 | Borugian | 340/584 |

(Continued)

FOREIGN PATENT DOCUMENTS

JP     2003-252173     9/2003

*Primary Examiner*—Suzanne Dino Barrett
(74) *Attorney, Agent, or Firm*—Carrier, Blackman & Associates, P.C.; Joseph P. Carrier; William D. Blackman

(57) ABSTRACT

A steering lock system includes at least an ignition switch and a locking mechanism capable of inhibiting the turning of a steering shaft. In a state in which the steering lock system is retained by a retaining means on a support table, a movable table is moved toward the support table, a turnable shaft which includes a key chuck means retaining a key at its tip end is rotatably driven by a driving means, thereby rotatably driving a rotor of the steering lock system. By examining the change in the switching mode of the ignition switch in accordance with the turning of the rotor by a switch signal checking means and examining the operational state of the locking mechanism by a locking operation examining means, the inspection can be conducted continuously and automatically on the operation of at least the ignition switch and the locking mechanism of the steering lock system. Thus, it is possible to inspect the operation of the steering lock system, while reducing the number of operating steps and the operating space.

2 Claims, 8 Drawing Sheets

U.S. PATENT DOCUMENTS

| | | | |
|---|---|---|---|
| 6,764,428 B2 * | 7/2004 | Rudolph et al. | 477/99 |
| 6,829,956 B2 * | 12/2004 | Kitamura | 73/865.9 |
| 6,886,422 B2 * | 5/2005 | King et al. | 73/865.8 |
| 6,941,779 B2 * | 9/2005 | Shigeyama et al. | 70/186 |
| 7,017,431 B2 * | 3/2006 | King et al. | 73/865.8 |
| 7,185,552 B2 * | 3/2007 | Wells et al. | 73/864.91 |
| 2001/0037694 A1 * | 11/2001 | Freifeld | 73/865.8 |
| 2004/0159168 A1 * | 8/2004 | Knerr | 73/865.8 |
| 2005/0261804 A1 * | 11/2005 | Doty et al. | 700/275 |
| 2006/0131096 A1 * | 6/2006 | Ono et al. | 180/400 |
| 2006/0155439 A1 * | 7/2006 | Slawinski et al. | 701/35 |
| 2006/0236792 A1 * | 10/2006 | Hanna | 73/865.8 |

* cited by examiner

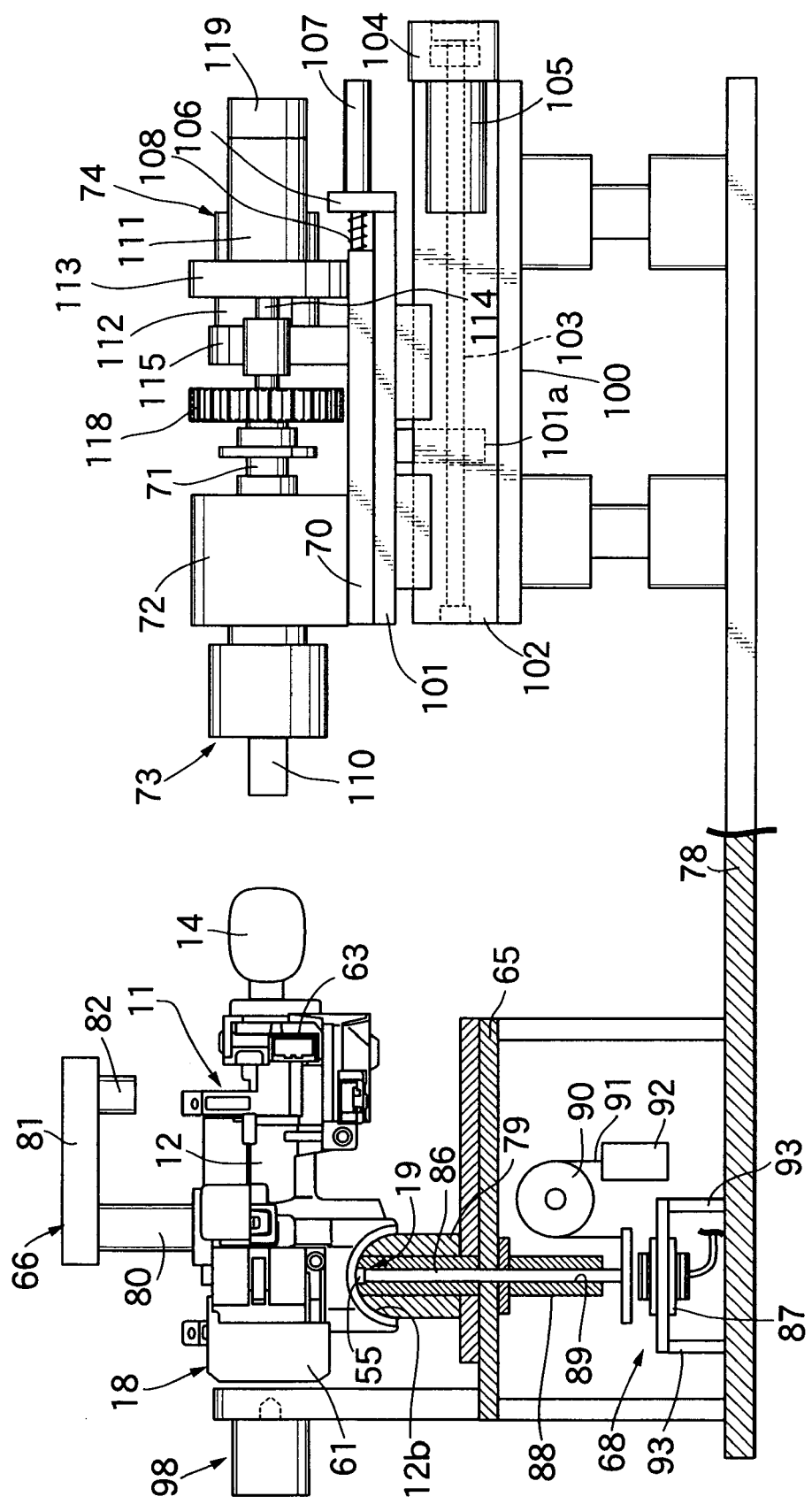

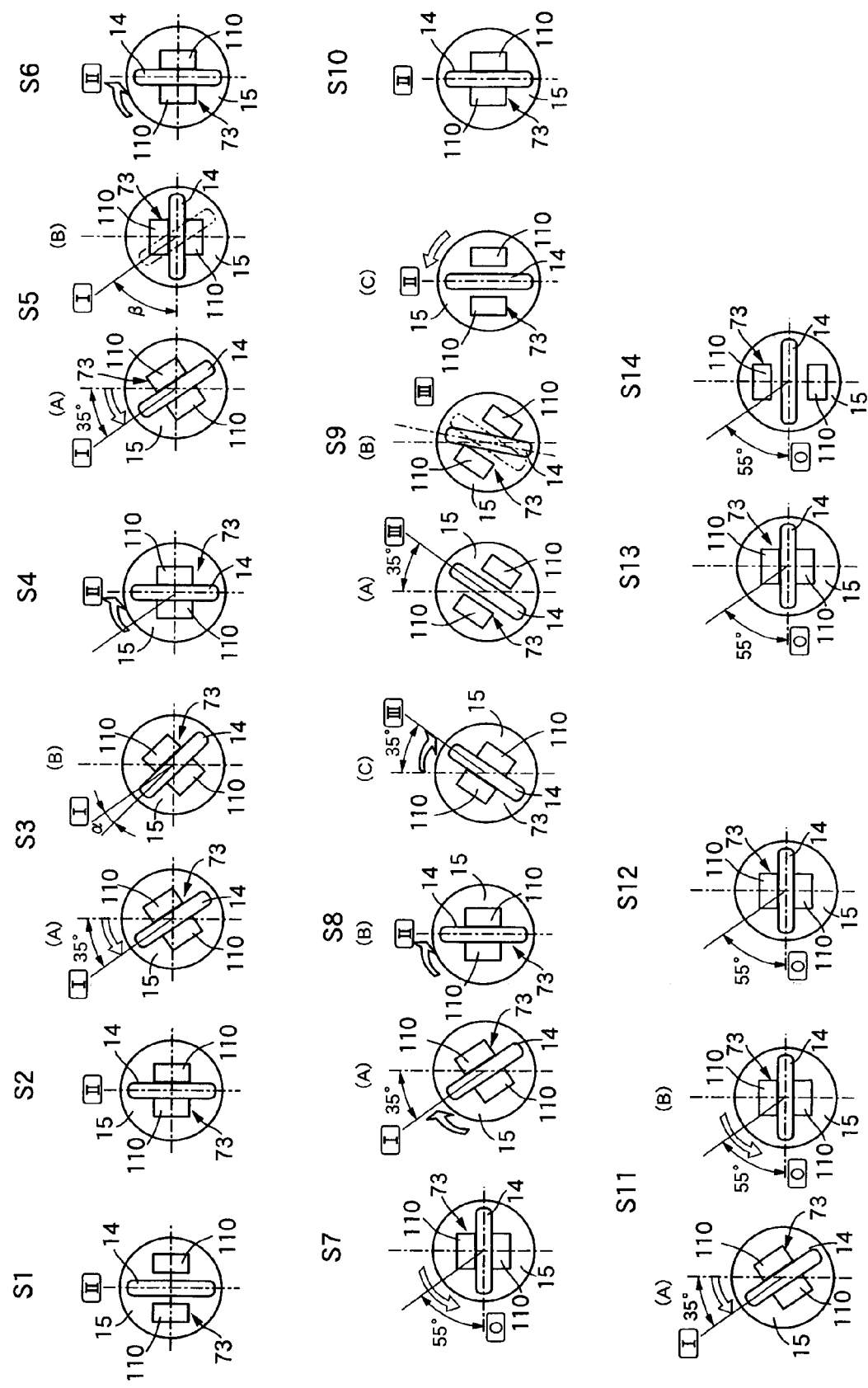

200# STEERING LOCK SYSTEM INSPECTION DEVICE

RELATED APPLICATION DATA

Japanese priority application No. 2004-223619, upon which the present application is based, is hereby incorporated in its entirety herein by reference.

BACKGROUND OF THE INVENTION

1. Field of the Invention

The present invention relates to a steering lock system inspection device for inspecting an operational state of a steering lock system which includes at least: an ignition switch which changes a switching mode in response to turning of a rotor adapted to be turned to pass sequentially through a LOCK position, an ACC position, an ON position and a START position in response to turning operation of a key inserted into a keyhole; and a locking mechanism which is switched over in response to turning of the rotor between a locking state for inhibiting turning of a steering shaft and an unlocking state for permitting the turning of the steering shaft.

2. Description of the Related Art

Japanese Patent Application Laid-open No. 2003-252173 or the like discloses a steering lock system including at least: an ignition switch which changes a switching mode in response to turning of a rotor; and a locking mechanism which is switched over between a locking state for inhibiting turning of a steering shaft and an unlocking state for permitting the turning of the steering shaft. Conventionally, the inspection of the operation of such a steering lock system after completion of the assembling thereof has been conducted by operators using jigs, respectively on operating portions of the ignition switch and the locking mechanism in separate steps.

In this conventional case where the operators conduct the inspection respectively on the plurality of the operating portions of the steering lock system, not only a large number of operating steps but also a relatively large operating space are required for the inspection.

SUMMARY OF THE INVENTION

Accordingly, it is an object of the present invention to provide a steering lock system inspection device which requires a less number of operating steps and a less operating space for the inspection.

In order to achieve the above-mentioned object, according to a first feature of the invention, there is provided a steering lock system inspection device for inspecting an operational state of a steering lock system which includes at least: an ignition switch which changes a switching mode in response to turning of a rotor adapted to be turned to pass sequentially through a LOCK position, an ACC position, an ON position and a START position in response to turning operation of a key inserted into a keyhole; and a locking mechanism which is switched over in response to turning of the rotor between a locking state for inhibiting turning of a steering shaft and an unlocking state for permitting the turning of the steering shaft, wherein the inspection device comprises: a stationary support table; a retaining means mounted on the support table to be capable of releasably retaining the steering lock system in a predetermined position; a switch signal checking means disposed on the support table to be capable of checking a signal output from the ignition switch; a locking operation examining means disposed on the support table to be capable of examining an operational state of the locking mechanism in a state in which the steering lock system is retained by the retaining means; a movable table capable of moving toward and away from the steering lock system retained by the retaining means in a direction along an axis of the rotor; a turnable shaft support means mounted on the movable table and rotatably carrying a turnable shaft having an axis extending in a direction of movement of the movable table; a key chuck means mounted at a tip end of the turnable shaft so as to releasably retain the key thereon; and a driving means mounted on the movable table to turnably drive the turnable shaft.

According to a second feature of the present invention, in addition to the first feature, the inspection device further comprises an energization control means disposed on the support table so as to control an energized state of a solenoid adapted to be energized at any shift position other than a parking position, in order to examine operation of an interlocking mechanism which is mounted on the steering lock system so as to inhibit the turning of the rotor from the ACC position to the LOCK position in response to the operation of the solenoid.

With the arrangement of the first feature of the present invention, in a state in which the steering lock system after completion of the assembling thereof is retained in the predetermined position by the retaining means on the support table, the rotor of the steering lock system can be turnably driven by moving the movable table toward the support table, retaining the key inserted into the keyhole by the key chuck means, and turning the turnable shaft having the key chuck means at its tip end by the driving means. By examining the change in the switching mode of the ignition switch in response to the turning of the rotor by the switch signal checking means and examining the operational state of the locking mechanism by the locking operation examining means, the inspection can be conducted continuously and automatically on the operation of at least the ignition switch and the locking mechanism of the steering lock system, so that the inspection of the operation of the steering lock system can be carried out reliably and with a good accuracy even by only one operator. Therefore, in the inspection of the operation of the steering lock system, the number of operating steps can be reduced; and moreover an operating space can be reduced, as compared with the conventional case where the inspection is conducted by operators using jigs respectively on the operating portions in separate steps.

With the arrangement of the second feature of the present invention, the inspection of the operation of the interlocking mechanism can be also conducted continuously and automatically in combination with the inspection of the operation of the ignition switch and the locking mechanism, leading to a further reduction in the number of the operating steps.

The above and other objects, features and advantages of the invention will become apparent from the following description of the preferred embodiment taken in conjunction with the accompanying drawings.

BRIEF DESCRIPTION OF THE DRAWINGS

FIG. 7 is a sectional view taken along a line 7-7 in FIG. 6.

FIG. 8 is diagrams sequentially showing turned states of a rotor during inspection of the operation.

DETAILED DESCRIPTION OF PREFERRED EMBODIMENT

The present invention will now be described by way of an embodiment with reference to the accompanying drawings.

Figure 1:
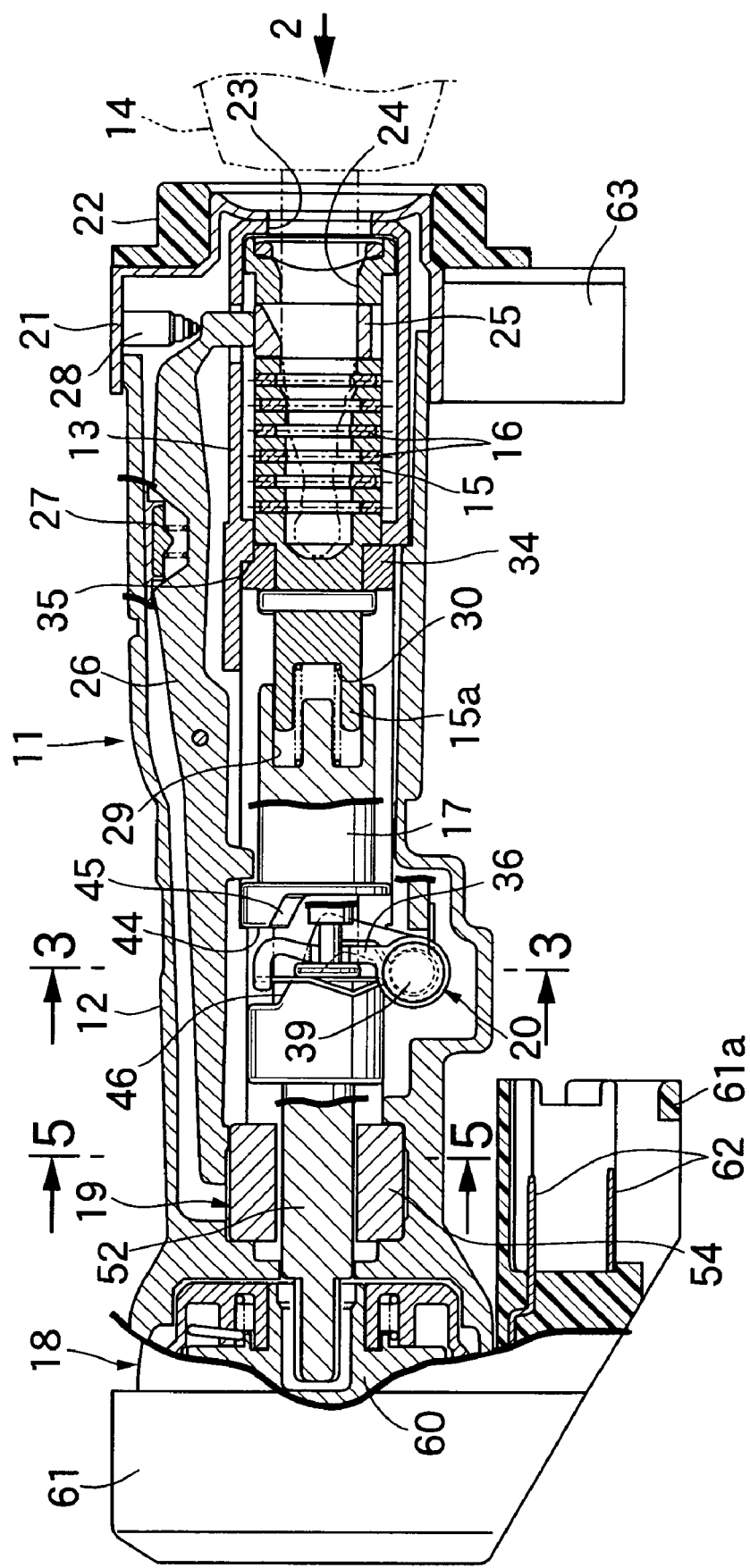
FIG. 1 is a vertical sectional side view of a steering lock system.

Referring first to FIG. 1, a steering lock system 11 includes: a housing 12 mounted to a steering column which is not shown; a cylinder 13 fixedly disposed in a front portion of the housing 12; a rotor 15 which is inserted into the cylinder 13 for turning about an axis and for axial movement within a limited range, and into which a key 14 can be removably inserted; a plurality of tumblers 16 mounted to the rotor 15 so that they can be switched over between the engagement with and disengagement from the cylinder 13; an operatively associated turnable shaft 17 which is disposed coaxially at a fixed axial position in the rear of the rotor 15, and which is carried in the housing 12 for turning about an axis; an ignition switch 18 connected to a rear end of the operatively associated turnable shaft 17 and mounted to a rear end of the housing 12; a locking mechanism 19 which is capable of being switched over between a locking state for inhibiting the turning of a steering shaft 50 (see FIG. 5) and an unlocking state for permitting the turning of the steering shaft 50 in response to the turning of the operatively associated turnable shaft 17; and an interlocking mechanism 20 mounted between the operatively associated turnable shaft 17 and the housing 12 in such a manner that the key 14 cannot be withdrawn from the rotor 15 unless a shifting lever (not shown) is shifted into a parking position.

A cover 21 is mounted at a front end of the housing 12 to cover a front end of the cylinder 13. A ring member 22 made of a synthetic resin is mounted on the cover 21 to cover the cover 21.

Figure 2:
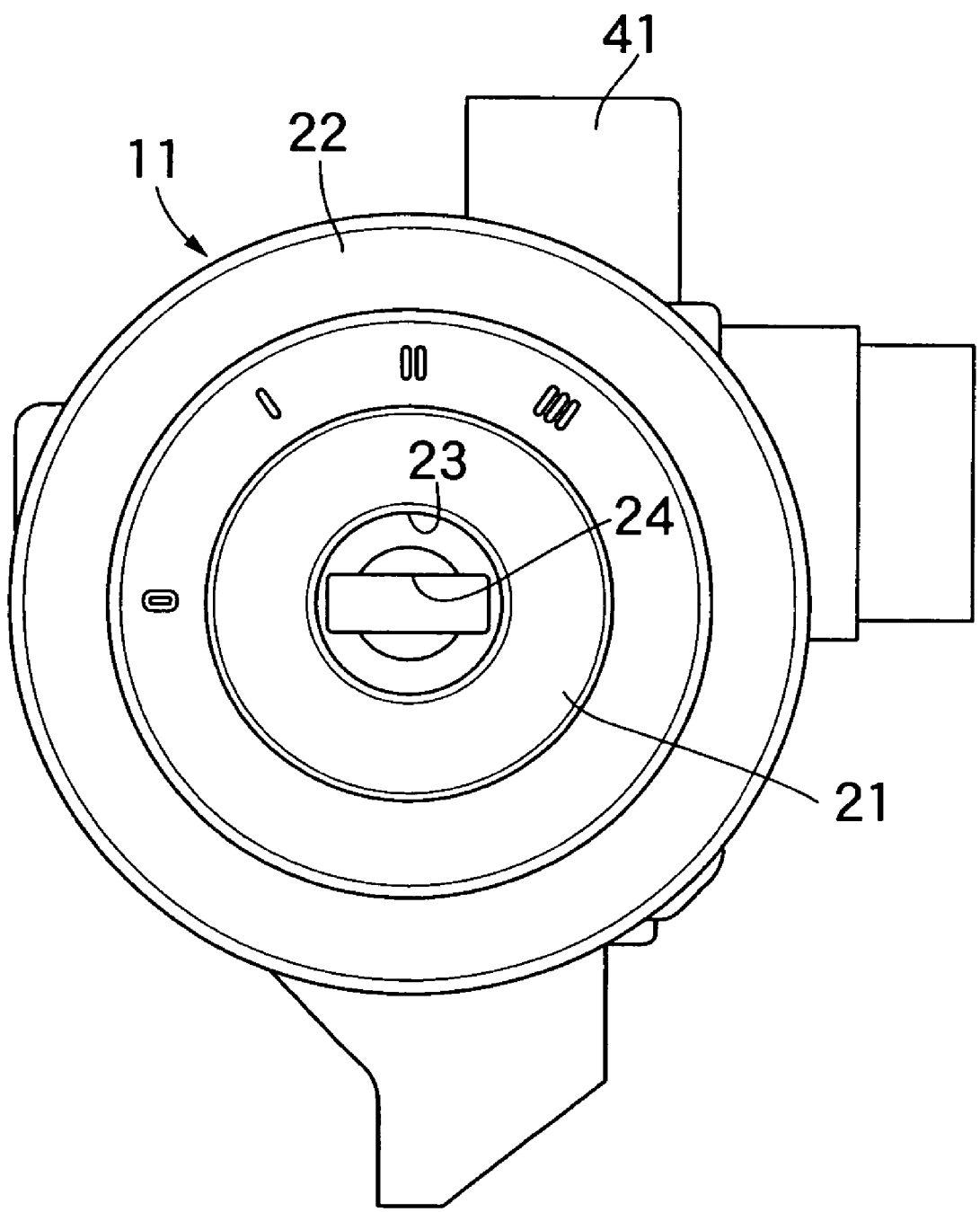
FIG. 2 is a view taken in a direction of an arrow 2 in FIG. 1.

Referring also to FIG. 2, a "0" position, a "I" position, a "II" position and a "III" position are indicated on a front surface of the ring member 22 at positions circumferentially spaced apart from one another. The "0" position is a key-insertion position and also a LOCK position for bringing the locking mechanism 19 into the locking state. The "I" position is an ACC position permitting an electric power to be supplied to auxiliaries other than an engine. The "II" position is an ON position for turning on the engine. The "III" position is a START position for starting the engine.

An opening 23 is provided at front ends of the cylinder 13 and the cover 21, so that a front end of the rotor 15 faces the opening 23. The rotor 15 is provided with a bottomed keyhole 24 which a front open end of the rotor 15 faces. The keyhole 24 has a rectangular cross-sectional shape extending longer along one radial line of the rotor 15 to permit the insertion of the key 14.

The tumblers 16 are mounted at a plurality of points spaced apart from one another in an axial direction of the rotor 15, while being spring-biased in a direction to engage with an inner surface of the cylinder 13. When a regular key 14 is inserted into the keyhole 24, the tumblers 16 are moved to positions where they are disengaged from the cylinder 13, thereby permitting the turning of the rotor 15. On the other hand, in a state in which no regular key 14 is inserted into the keyhole 24, the tumblers 16 are in engagement with the cylinder 13 to inhibit the turning of the rotor 15.

A key slider 25 is fitted into the front end of the rotor and adapted to be slid in response to insertion and removal of the regular key 14 into and from the keyhole 24. An operating lever 26 extends in a longitudinal direction through the housing 12 to be turnably carried in the housing 12, and its front end is disposed outside the key slider 25. The operating lever 26 is spring-biased in a direction to abut its front end against the key slider 25 by a spring force of a spring 27 interposed between the operating lever 26 and the housing 12. Thus, the operating lever 26 is turned in a direction opposite from the direction biased by the spring 27, in response to the key slider 25 being slid radially outwards of the rotor 15 by the insertion of the key 14 into the keyhole 24.

A key detecting switch 28 adapted to change the switching mode by the turning of the operating lever 26 in response to the insertion of the key 14 into the keyhole 24, is disposed outside the front end of the operating lever 26 in such a manner that it is fixedly supported on the housing 12.

The rotor 15 is coaxially and integrally provided with a connecting shaft portion 15a protruding rearwards from a rear end of the cylinder 13. A rear end of the connecting shaft portion 15a is fitted into a fitting recess 29 provided in a front end of the operatively associated turnable shaft 17, so that it can be slid relatively but axially but cannot be rotated relatively about an axis. Thus, the operationally associated turnable shaft 17 is also rotated in operative association with the turning of the rotor 15.

A spring 30 is mounted between the operationally associated turnable shaft 17 and the connecting shaft portion 15a, so that the connecting shaft portion 15a, i.e., the rotor 15 is biased forwards by the spring 30. On the other hand, a ring-shaped collar 34 is fixed to the connecting shaft portion 15a, so that the forward movement of the connecting shaft portion 15a, i.e., the rotor 15 is restricted by the sliding contact of the collar 34 with an engagement face 35 provided at the rear end of the cylinder 13. Moreover, the engagement face 35 is formed so that an operation for pushing the key 14 rearwards against the spring force of the spring 30 is requited when the rotor 15 is rotated by the key 14 from the ACC position to the LOCK position.

Figure 3:
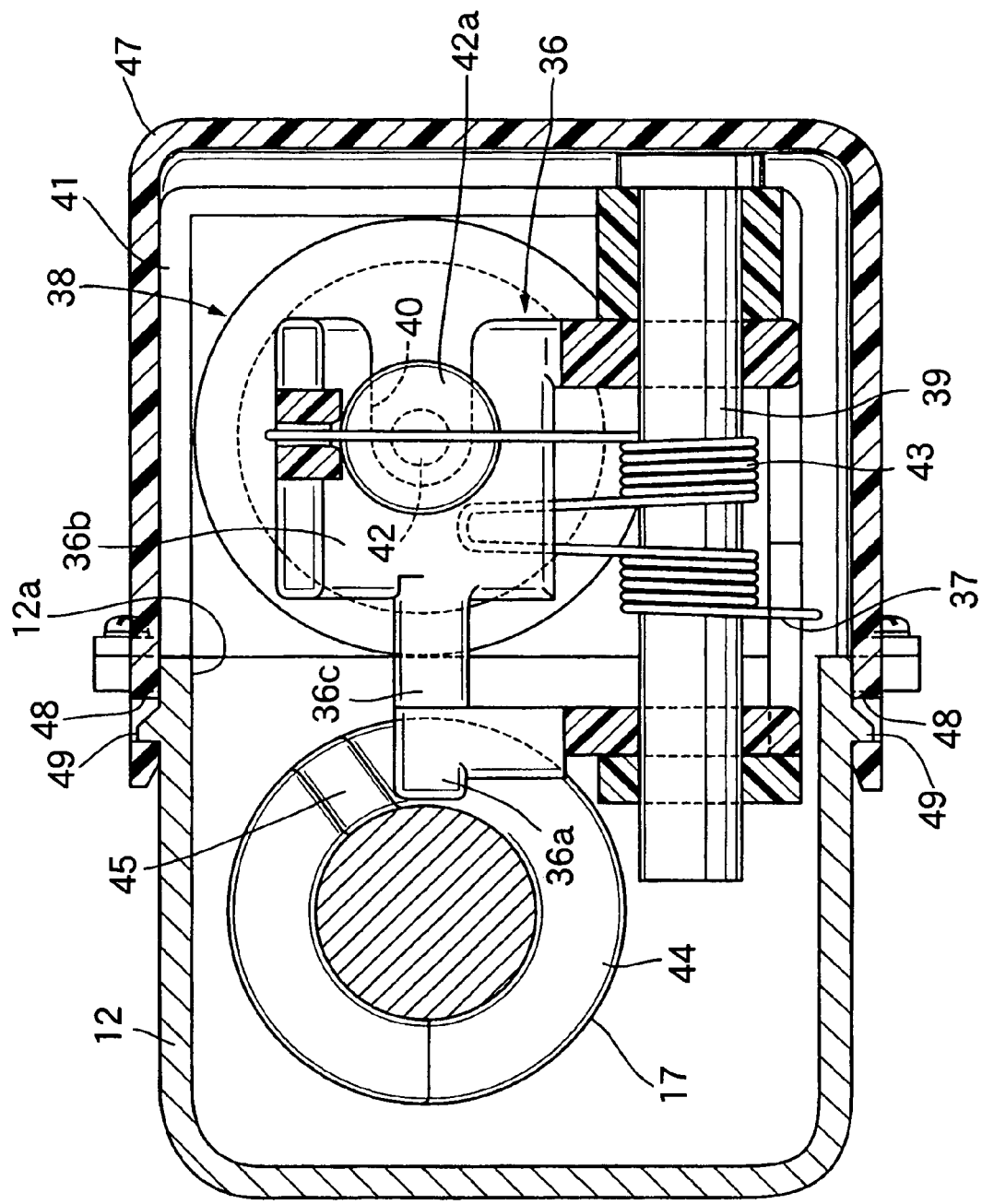
FIG. 3 is an enlarged sectional view taken along a line 3-3 in FIG. 1.
Figure 4:
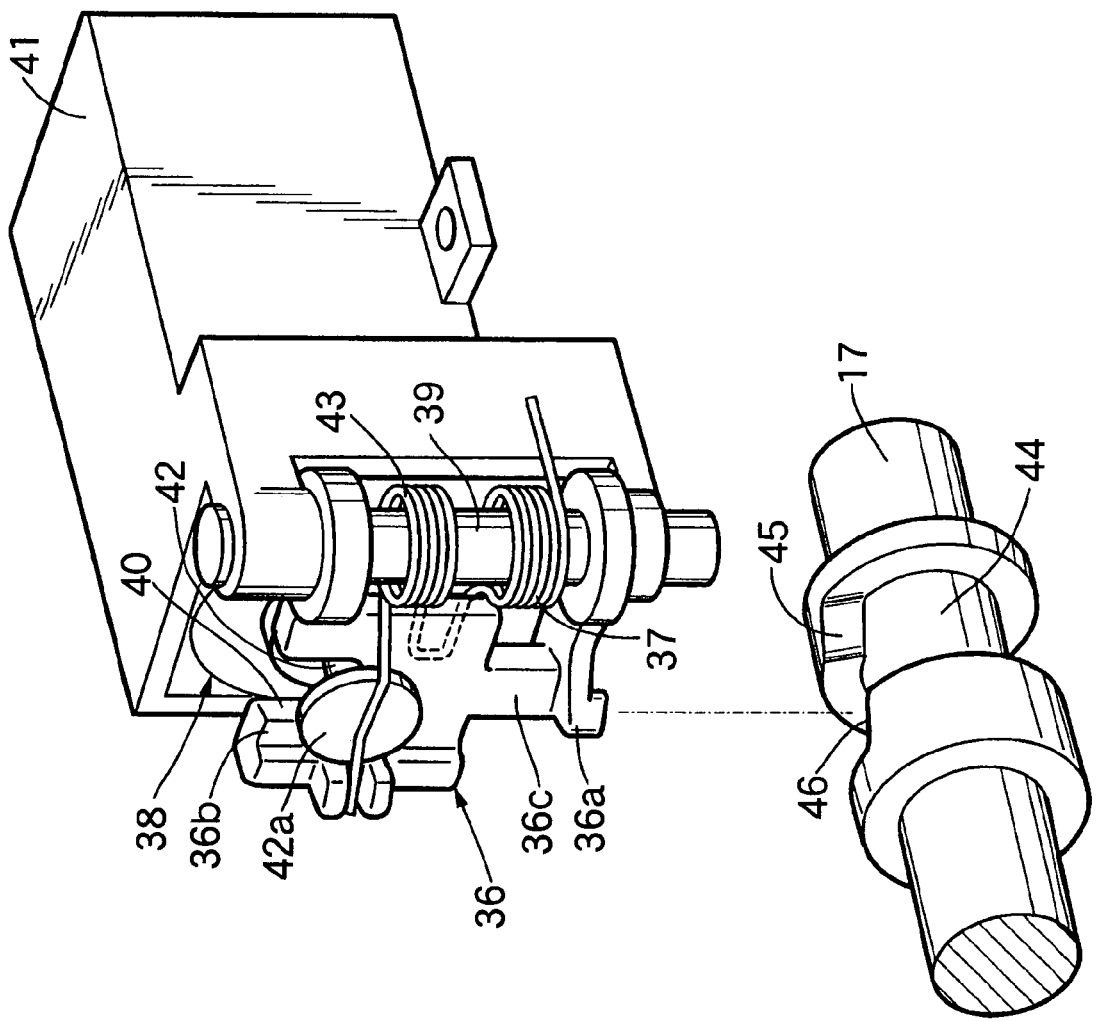
FIG. 4 is a perspective view showing the arrangement of an interlocking device.

Referring to FIGS. 3 and 4, the interlocking mechanism 20 comprises: a block lever 36 capable of being turned between an engaged position in which it is in engagement with an axially intermediate portion of the operationally associated turnable shaft 17 to inhibit the turning from the ACC position to the LOCK position and a disengaged position in which it is out of engagement with the operationally associated turnable shaft 17 to permit the turning from the ACC position to the LOCK position; a return spring 37 for biasing the block lever 36 toward the disengaged position; and a solenoid 38 which exhibits an electromagnetic force for biasing the block lever 36 toward the engaged position against a spring force of the return spring 37.

The block lever 36 is turnably supported by a support shaft 39 having an axis perpendicular to a plane including an axis of the operationally associated turnable shaft 17. The block lever 36 integrally includes: a turnable-shaft engagement portion 36a turnably carried at its base end on the support shaft 39; a solenoid engagement portion 36b turnably carried at its base end on the support shaft 39 at a location spaced apart from the turnable-shaft engagement portion 36a along the axis of the support shaft 39; and a connecting portion 36c which connects the turnable-shaft engagement portion 36a and the solenoid engagement portion 36b to each other. An engagement recess 40 is provided in the solenoid engagement portion 36b to open to a side opposite from the turnable-shaft engagement portion 36a.

The support shaft 39 is supported on a solenoid housing 41 mounted to an outer surface of the housing 12. A solenoid 38 having an operational axis parallel to the operationally associated turnable shaft 17 is accommodated and fixed in the solenoid housing 41, and adapted to be brought into energized state when a shift lever (not shown) is in any position other than the parking position. The return spring 37, which is a torsion spring surrounding the support shaft 39, is mounted between the solenoid engagement portion 36b of the block lever 36 and the solenoid housing 41 in such a manner that it biases the block lever 36 toward the disengaged position.

The solenoid 38 includes a rod 42 which is inserted into the engagement recess 40 in the solenoid engagement portion 36b of the block lever 36, so that it is operated in a retracted direction upon energization of the solenoid 38. The rod 42 is integrally provided at its tip end with an engagement flange 42a which is capable of being brought into engagement with the solenoid engagement portion 36b from the disengaged position. An urging spring 43, which is a torsion spring surrounding the support shaft 39, is mounted between the engagement flange 42a and the solenoid engagement portion 36b, so that a spring force is applied from the urging spring 43 to the engagement flange 42a in a direction to bring the engagement flange 42a into engagement with the solenoid engagement portion 36b. Thus, the block lever 36 and the rod 42 are interconnected in operative association through the urging spring 43, so that the rod 42 is operated to a retracted position in operative association with and in response to the turning operation of the block lever 36 from the disengaged position to the engaged position. The urging spring 43 is formed integrally with the return spring 37.

An accommodation groove 44 is annularly formed around an outer periphery of an intermediate portion of the operatively associated turnable shaft 17 to accommodate a tip end of the turnable-shaft engagement portion 36a of the block lever 36. A restricting face 45 is provided on a portion of a front side face of the accommodation groove 44, and adapted to be brought into engagement with the turnable-shaft engagement portion 36a of the block lever 36 situated in the engaged position to inhibit the turning of the operatively associated turnable shaft 17, i.e., the rotor 15 from the ACC position to the LOCK position.

A cam face 46 is provided on a portion of a rear side face of the accommodation groove 44 and adapted to be put into abutment against the turnable-shaft engagement portion 36a of the block lever 36 situated in the disengaged position in response to the turning of the rotor 15, i.e., the operatively associated turnable shaft 17 from the LOCK position to the ACC position. The cam face 46 is formed into a shape which causes the block lever 36 to be operated to the engaged position against the spring force of the return spring 37 in response to the turning of the rotor 15, i.e., the operatively associated turnable shaft 17 from the ACC position toward the ON position.

In such interlocking mechanism 20, when the operatively associated turnable shaft 17 is rotated to the START position by the key 14 inserted into the keyhole 24 to start the engine, the solenoid 38 is in a non-energized state and the block lever 36 is in the disengaged position when in the LOCK position. When the operatively associated turnable shaft 17 is rotated from the LOCK position to the ACC position, the cam face 46 is put into abutment against the turnable-shaft engagement portion 36a of the block lever 36. When the operatively associated turnable shaft 17 is further rotated from the ACC position to the START position, the block lever 36 is forcibly turned by the cam face 46 to the engaged position against the spring force of the return spring 37.

Moreover, after the operatively associated turnable shaft 17 is rotated to the START position to start the engine and before shifting the shift lever to a DRIVE position or the like other than the parking position to start the energization of the solenoid 38, the rod 42 of the solenoid 38 is brought into the retracted position in operative association with the block lever 36 by the urging spring 39. Therefore, when the shift lever is shifted to the DRIVE position or the like to start the energization of the solenoid 38 after the start of the engine, the solenoid 38 needs to exhibit an electromagnetic force only enough to retain the rod 42 in the retracted position.

When the rotor 15 and the operatively associated turnable shaft 17 are operated from the ON position to the ACC position by the operation of the key 14, the engine is stopped. In this case, if the shift lever is in any position other than the parking position at that time, the solenoid 38 remains energized, and the rod 42 remains in the retracted position. As long as the rod 42 is in the retracted position, the block lever 36 cannot be turned toward the disengaged position, and even if an attempt is made to rotate the operatively associated turnable shaft 17 and the rotor 15 from the ACC position to the LOCK position, the abutment of the turnable-shaft engagement portion 36a of the block lever 36 against the restricting face 45 inhibits the turning of the rotor 15 and the operatively associated turnable shaft 17 toward the LOCK position, thereby inhibiting withdrawal of the key 14 out of the keyhole 24.

In this case, when the shift lever is shifted to the parking position, the energization of the solenoid 38 is stopped, and in response the block lever 36 is returned to the disengaged position by the spring force of the return spring 37 to permit the turning of the rotor 15 and the operatively associated turnable shaft 17 from the ACC position to the LOCK position, thereby allowing the key 14 can be withdrawn out of the keyhole 24.

The solenoid 38 is accommodated and fixed in the solenoid housing 41 mounted to the outer surface of the housing 12, while the operatively associated turnable shaft 17 is disposed in the housing 12. The housing 12 is provided with the opening 12a, which a portion of the operatively associated turnable shaft 17 corresponding to the accommodation groove 44 faces. The support shaft 39, the block lever 36 carried on the support shaft 39, the rod 42 of the solenoid 38 as well as a portion of the solenoid housing 41 are covered with a cover 47 made of a synthetic resin. A plurality of engagement bores 48 are provided in an end of the cover 47 adjacent the housing 12. The cover 47 is detachably mounted to the housing 12 by bringing a plurality of engagement claws 49 projectingly provided on the housing 12 into resilient engagement with the engagement bores 48.

Figure 5:
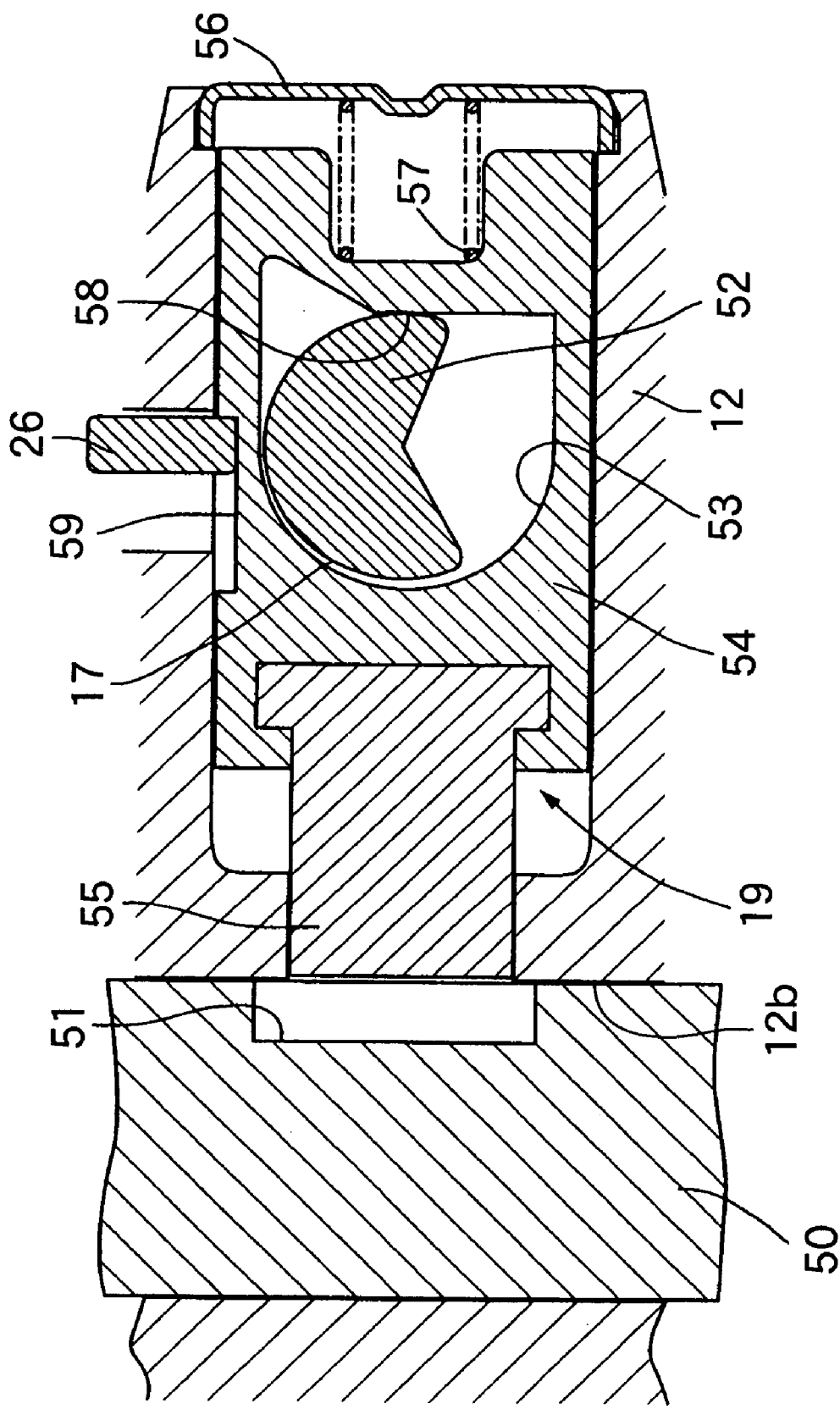
FIG. 5 is an enlarged sectional view taken along a line 5-5 in FIG. 1.

Referring to FIG. 5, the locking mechanism 19 is switched over between the locking state in which it is in engagement with an engagement recess 51 provided in an outer periphery of the steering shaft 50 to inhibit the turning of the steering shaft 50, and the unlocking state in which it is out of engagement with the engagement recess 51 to permit the turning of the steering shaft 50. The locking mechanism 19 includes: a cam 52 provided at an intermediate portion of the operatively associated turnable shaft 17;

a slider 54 slidably fitted into the housing 12 and having a through-hole 53 through which the cam 52 is passed; a locking pin 55 connected to the slider 54 and capable of engaging with the engagement recess 51 in the steering shaft 50; and a spring 57 mounted between a cap 56 mounted to the housing 12 and the slider 54 for biasing the slider 54 in a direction to bring the locking pin 55 into engagement with the engagement recess 51.

An abutment face 58 is formed on an inner surface of the through-hole 53 and adapted to abut against the cam 52 to determine the position of the slider 54. An arcuate opposed face 12b is formed on the housing 12 and opposed to an outer periphery of the steering shaft 50. The locking pin 55 is adapted to protrude from the opposed face 12b into engagement with the engagement recess 51 in the steering shaft 50.

In this locking mechanism 19, when the rotor 15 is in any position other than the LOCK position, i.e., in the ACC position, the ON position or the START position, the locking pin 55 is disengaged from the engagement recess 51 to permit the turning of the steering shaft 50. When the rotor 15 is in the LOCK position, the cam 52 is in a turned position in which the slider 54 is caused to move by the spring force of the spring 57 to bring the locking pin 55 into engagement with the engagement recess 51. On the other hand, the operating lever 26 is turned in a direction such that its rear end approaches the slider 54 in response to the key slider 25 being slid outwards in a radial direction of the rotor 15 by the insertion of the key 14 into the keyhole 24. An engagement recess 59 is provided in an outer surface of the slider 54 for engagement of a rear end of the operating lever 26 to maintain the unlocking state of the locking mechanism 19, when the locking mechanism 19 is brought into the unlocking state in response to the turning of the rotor 15 to any position other than the LOCK position. Namely, even if the rotor 15 is in the LOCK position, the locking mechanism 19 cannot be brought into the locking state, unless the operating lever 26 is turned in a direction to disengage its rear end from the engagement recess 59 by withdrawing the key 14 out of the keyhole 24.

Referring again to FIG. 1, the operatively associated turnable shaft 17 is connected at its rear end to an operating member 60 included in the ignition switch 18, so that it cannot be relatively rotated about the axis. The ignition switch 18 is operated to change the witching mode in response to the turning of the operating member 60 due to the turning of the operatively associated turnable shaft 17.

A switch housing 61 of the ignition switch 18 is mounted to a rear portion of the housing 12. A coupler portion 61a of a female type is integrally provided on the switch housing 61 in such a manner that it is located sideways of the rear portion of the housing 12. A plurality of connecting terminals 62 connected to a plurality of fixed contacts (not shown) included in the ignition switch 18 are disposed within the coupler portion 61a.

Further, a coupler 63, for example, of a female type faced by a terminal (not shown) connected to the solenoid 38 of the interlocking mechanism 20 as well as a terminal connected to the key-detecting switch 28, is disposed at a front portion of the housing 12 to protrude sideways from the housing 12.

Figure 6:
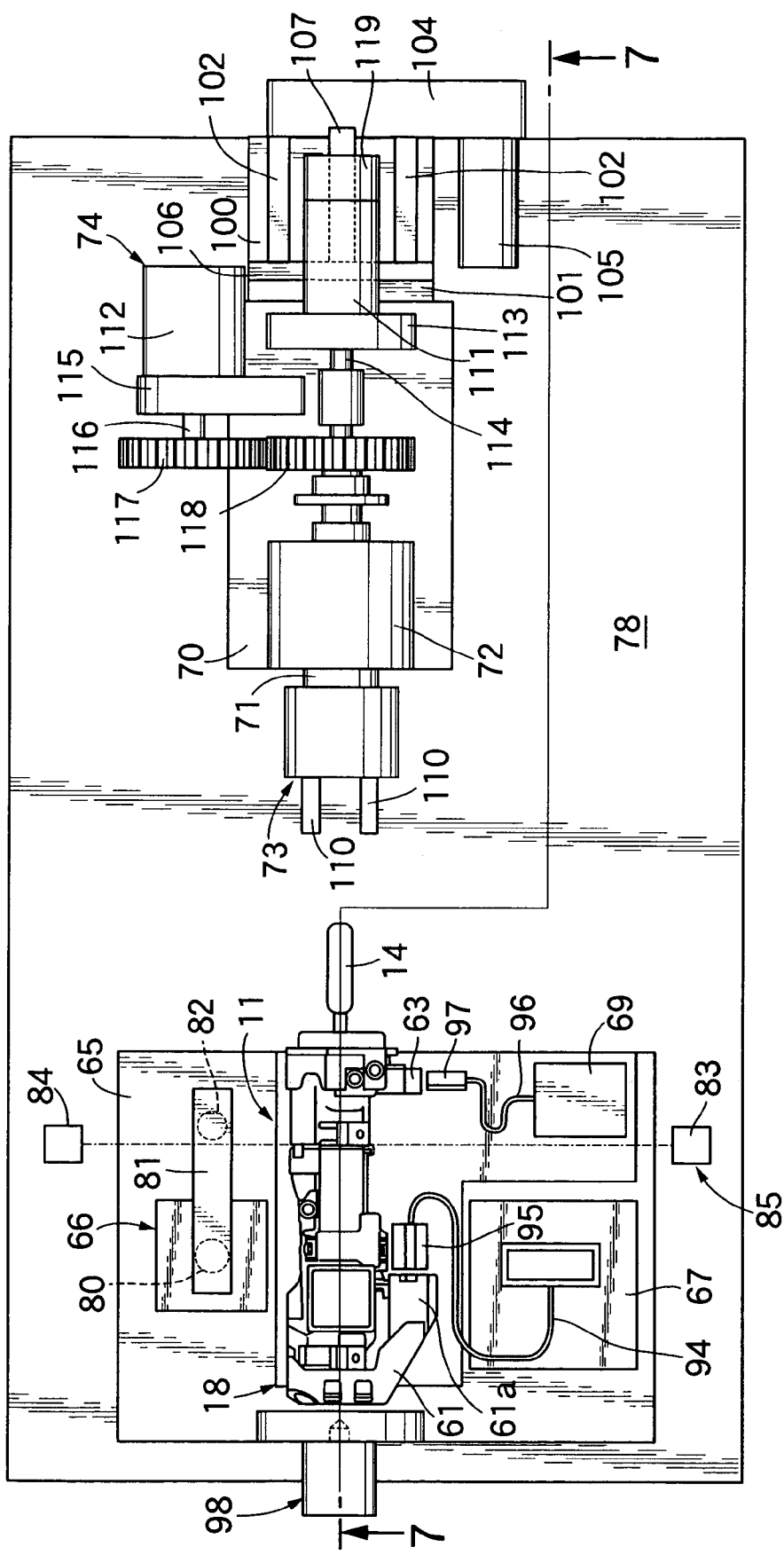
FIG. 6 is a plan view of an inspection device.

To inspect the operation of the steering lock system 11, an inspection device shown in FIGS. 6 and 7 is used. This inspection device includes: a stationary support table 65; a retaining means 66 mounted on the support table 65 in such a manner that the steering lock system 11 can be detachably retained in a predetermined position; a switch signal checking means 67 disposed on the support table 65 to be capable of checking a signal output from the ignition switch 18; a locking operation examining means 68 disposed in the support table 65 to be capable of examining the operated state of the locking mechanism 19 in a state in which the steering lock system 11 is retained by the retaining means 66; an energization control means 69 disposed on the support table 65 to be capable of controlling the energization of the solenoid 38 of the interlocking mechanism and to confirm the presence or absence of the signal from the key-detecting switch 28; a movable table 70 which is capable of moving toward and away from the steering lock system retained by the retaining means 66 in a direction along the axis of the rotor 15; a turnable shaft support means 72 which is mounted on the movable table 70 and on which a turnable shaft 71 having an axis extending in a direction of movement of the movable table 70 is supported for turning about an axis; a key chuck means 73 mounted at a tip end of the turnable shaft 71 in such a manner that the key 14 can be releasably retained thereon; and a driving means 74 mounted on the movable table 70 to turnably drive the turnable shaft 71.

The support table 65 is disposed on a stationary base 78, so that it is fixedly disposed at a location spaced upwards apart from an upper surface of the stationary base 78. The retaining means 66 includes: a receiving table 79 fixed to the support table 65 to abut, from below, against the arcuate opposed face 12b included in the housing 12 of the steering lock system 11; a support column 80 which is ascendably, descendably and turnably disposed sideways of the steering lock system 11 having the opposed face 12b placed on the receiving table 79; an arm 81 fixed to an upper end of the support column 80 and extending sideways; and a retaining member 82 mounted on a lower surface of a tip end of the arm 81. Thus, by retaining by the retaining member 82 from above the upper surface of the steering lock system 11 with the opposed face 12b placed on the receiving table 79, the steering lock system 11 can be retained so that its axis is horizontal; and releasing the retained state of the steering lock system 11 by retracting the retaining member 82 sideways from the position above the steering lock system 11 by the lifting and turning operation of the support column 80.

In order to confirm whether or not the steering lock system 11 is in a state in which it is retained by the retaining means 66, for example, a work-identifying means 85 is disposed on the base 78. The work-identifying means 85 comprises a transmitting section 83 and a receiving section 84, for example, between which the steering lock system 11 is sandwiched from opposite sides.

The locking operation examining means 68 includes: a detection rod 86 which extends vertically in such a manner that its upper end abuts against the locking pin 55 of the locking mechanism 19 from below and which is biased upwards; and a displacement detecting sensor 87 for detecting that the detection rod 68 is pushed and moved downwards by the locking pin 55.

A guide tube 88 is secured to the support table 65 below the receiving member 79. A guide bore 89, into which the detection rod 86 is ascendably and descendably fitted, is provided in the receiving member 79, the support table 65 and the guide tube 88. An upper end of the detection rod 86 fitted into the guide bore 89 coaxially abuts against the locking pin 55 protruding from the opposed face 12b placed on the receiving member 79.

A pulley 90 is rotatably carried on the support table 65, so that it is disposed sideways of the guide tube 88. A cable 91 connected at one end to a lower end of the detection rod 86 is reeved around the pulley 90. A weight 92 is mounted at the other end of the cable 91. Therefore, a load of the weight 92 acts upwards to the detection rod 86. Further, a support frame 93 is mounted on the base 78 below the detection rod 86 to support the displacement detecting sensor 87.

With this locking-operation detecting means 68, when the locking mechanism 19 is operated normally in response to the turning of the rotor 15 to cause the locking pin 55 to protrude, the displacement detecting sensor 87 detects such a normal operation of the locking mechanism 19 by detecting the detection rod 86 pushed and moved downwards by the locking pin 55.

A male coupler 95 disconnectably connected to the female coupler portion 61a included in the switch housing 61 of the ignition switch 18, is mounted at a tip end of a lead wire 94 connected to the switch signal checking means 67, and thus, by connecting the coupler 95 to the coupler portion 61a, a signal output from the ignition switch 18 can be checked by the switch signal checking means 67.

A male coupler 97 disconnectably connected to the female coupler 63 mounted at the front portion of the housing 12, is mounted at a tip end of a lead wire 96 connected to the energization control means 69, and thus, by connecting the coupler 97 to the coupler 63, the energization of the solenoid 38 of the interlocking mechanism 20 can be controlled by the energization control means 69, and a signal output from the key-detecting switch 28 can be also identified by the energization control means 69.

A marking means 98 is disposed on the support table 65, so that it is located behind the switch housing 61. The marking means 98 is adapted to stamp a mark to the switching housing 61 of the ignition switch 18 included in the steering lock system 11, when the normal operation of the steering lock system 11 retained by the retaining means 66 is confirmed.

A ascendable/descendable elevator 100 is disposed on the base 78 at a location spaced forwards apart from the steering lock system 11 retained by the retaining means 66. A slide table 101 is disposed on the elevator 100 to be slidable in the direction along the axis of the rotor 15 included in the steering lock system 11. The movable table 70 is disposed on the slide table 101 for movement relative to the slide table 101 in the direction along the axis of the rotor 15.

A pair of rails 102, 102 are mounted on the elevator 100 to extend in the direction along the axis of the rotor 15. The slide table 101 is slidably guided by the guide rails 102, 102. Moreover, a threaded shaft 103 turnably carried on the elevator 100 is threadedly engaged with a pendent portion 101a suspended from a lower surface of the slide table 101. A reversible electric motor 105 is connected to the threaded shaft 103 through a reduction gear mechanism (not shown) housed in a gear case 104 mounted to the elevator 100. The electric motor 105 is supported on the gear case 104, so that it is located sideways of the elevator 100.

Thus, the slide table 101 is slid toward and away from the steering lock system 11 retained by the retaining means 66, with the rotation of the threaded shaft 103 due to the operation of the electric motor 105.

A cylinder 107 having an axis parallel to the guide rails 102, 102 and the threaded shaft 103 is supported on a support wall 106 provided at an end of the slide table 101 on the side opposite from the steering lock system 11 retained by the retaining means 66. A rod 108 of the cylinder 107 is axially movably passed through the support wall 106 to be connected to the movable table 70. Therefore, the movable table 70 can be moved toward and away from the steering lock system 11 retained by the retaining means 66, while being moved relative to the slide table 101, by operating the cylinder 107 in an expansion and contraction manner.

The turnable shaft support means 72 is mounted at an end of the movable table 70 adjacent to the support table 65, to support an intermediate portion of the turnable shaft 71 having the axis extending in the direction of movement of the movable table 70 for turning about the axis.

The key chuck means 73 includes a pair of clamping pieces 110, 110 for clamping from opposite sides the key inserted into the keyhole 24 in the steering lock system 11, and is capable of being switched over between a retaining state in which the key 14 is retained by moving the two clamping pieces 110, 110 toward each other to clamp the key 14, and a retention-releasing state in which the retention of the key 14 is released by moving the clamping pieces 110, 110 away from each other.

The driving means 74 includes a servomotor 111 and a rotary solenoid 112. A rotary shaft 114 of the servomotor 111 supported on a support wall 113 provided on the movable table 70 is coaxially and relatively non-rotatably connected to the turnable shaft 71. The rotary solenoid 112 is supported on a support wall 115 provided on the movable table 70, and fixedly disposed adjacent to and sideways of the servomotor 111. A driving gear 117 is fixed to a rotary shaft 116 of the rotary solenoid 112. A driven gear 118 meshed with the driving gear 117 is fixed to the turnable shaft 71. Thus, a power output from the rotary solenoid 112 is transmitted through the driving gear 117 and the driven gear 118 to the turnable shaft 71.

Moreover, the servomotor 111 and the rotary solenoid 112 are designed so that the rotary shaft 114, 116 can freely rotate during non-operation of the servomotor 111 and the rotary solenoid 112. A turning-angle detector 119 such as an encoder for detecting an angle of turning of each of the rotary shaft 114 and the turnable shaft 71 is coupled to a side of the servomotor 111 opposite from the turnable shaft 71.

A procedure for inspecting the operation of the steering lock system 11 using such an inspection device will be described below with reference to FIG. 8. At the first Step S1, in a state in which the steering lock system 11 is retained by the retaining means 66; the coupler 95 connected to the switch signal checking means 67 is connected to the coupler portion 61a of the ignition switch 18; and the coupler 97 connected to the energization control operation of the interlocking mechanism 20 is normal, the rod 42 of the solenoid 38 should be retracted into the solenoid housing 41, thereby permitting the rod 15 to be turned toward the "0" position (the LOCK position) via the "I" position (the ACC position) where the rod 15 is turned through 35 degree from the "II" position, as shown in (A). When it is detected by the turning-angle detector 119 that an angle β of turning from the "I" position toward the "0" position is in a range of 45 to 85 degree as shown in (B), it is determined that the restoring operation of the interlocking mechanism 20 is normal.

At the sixth Step S6, the rotor 15 is returned to the "II" position by the servomotor 111 with the rotary solenoid 112 left on the free rotation state, and further, at the seventh Step S7, the rotor 15 is turned to the "0" position.

At the eighth Step S8, the examination is carried out on the conduction angle of the ignition switch 18 during turning in a normal direction. More specifically, in a state in which the rotary solenoid 112 is brought into the free rotation state, the rotor 15 is turned in the normal direction from the "0" position to the "III" position (the START position) in such a manner to reach (C) from (A) via (B). During this time, the operational situation of the ignition switch 18 can be detected by the switch signal checking means 67; the operational situation of the key-detecting switch 28 can be detected by the energization control means 69; and the operational situation of the locking mechanism 19 can be detected by the locking state examining means 68. At the eighth Step S8, the check is conducted on the presence or absence of an instantaneous cut-off due to a damage on a contact of the means 69 is connected to the coupler 63 mounted on the housing 12, the movable table 70 is advanced toward the steering lock system 11 with the key 14 inserted into the keyhole 24 to turn the rotor 15 to the "II" position (the ON position).

At the second Step S2, the key 14 in the "II" position is clamped by the two clamping pieces 100, 100 of the key chuck means 73. At the next Step S3, in a state in which a lowest operating voltage, e.g., 7 V is applied to the solenoid 38 of the interlocking mechanism 20, a predetermined torque is applied to the key 14 so that the key 14 is turned toward the "0" position by the rotary solenoid 112 with the servomotor 111 left in a free rotation state. At this time, if the interlocking mechanism 20 is normal, the rotor 15 should exhibit a force for inhibiting the turning to the "0" position (the LOCK position) at the "I" position (the ACC position) turned through 35 degree from the "II" position as shown in (A); and when it is detected by the turning-angle detector 119 that the angle α of turning from the "I" position toward the "0" position is in a range of 0 to 30 degree as shown in (B), it is determined that the interlocking mechanism 20 is normally operative.

At fourth Step S4, the rotor 15 is returned to the "II" position by the servomotor 111 with the rotary solenoid 112 left in a free rotation state, and at the next fifth Step S5, the restoring state of the interlocking mechanism 20 is examined. More specifically, in a state in which a voltage, e.g., of 0.7 V is applied to the solenoid 38 of the interlocking mechanism 20, a predetermined torque is applied to the key 14 so that the key 14 is turned to the "0" position by the rotary solenoid 112, with the servomotor 111 being left in the free rotation state. At this time, if the restoring ignition switch 18 or a tucked-in foreign matter, and the examination of chattering is also carried out by measuring a time for which an amount of voltage reduction between the terminals exceeds a defined value.

At the ninth Step S9, in a state in which the rotor 15 and the key 14 are in the "III" position, the retaining of the key 14 by the key chuck means 73 is released. This permits the key 14 and the rotor 15 to be turned from (A) via (B) to (C); and if the key 14 is turned automatically to the "II" position, then it is determined that an automatic returning function of the rotor 15 is normal. At the tenth Step S10, the key 14 in the "II" position is clamped again by the two clamping pieces 100, 100 of the key chuck means 73.

At the eleventh Step S11, the examination is carried out on the conduction angle of the ignition switch 18 during turning in a reverse direction. More specifically, in the state in which the rotary solenoid 112 is in the free rotation state, the rotor 15 is turned in the reverse direction from the "I" position to the "0" position in such a manner to reach (B) from (A). During this process, the operational situation of the ignition switch 18 is detected by the switch signal checking means 67; the operational situation of the key-detecting switch 28 is detected by the energization control means 69; and the operational situation of the locking mechanism 19 is detected by the locking operation examining means 68. The examination of chattering similar to that at the eighth Step S8 is also carried out at the eleventh Step S11.

At the twelfth Step S12, in a state in which the key 14 is in the "0" position, the movable table 70 is retracted, and the key 14 is withdrawn from the rotor 15. Thereafter, the following examinations are carried out: the examination of an insulation resistance for determining whether or not there is a short-circuit or electric leakage between the terminals of the coupler portion 61a and the coupler 95 as well as between the terminals of the couplers 63 and 97; the examination of the operational situation of the locking mechanism 19 by the locking operation examining means 68; and the examination of the operation of the key-detecting switch 28 by the energization control means 69.

At the thirteenth Step S13, the key 14 is inserted into the rotor 15 by advancing the movable table 70. Further, at the fourteenth Step S14, the retaining of the key 14 by the key chuck means 72 is released; the movable table 70 is retracted to the original position; the turnable shaft 71 is turned to a position corresponding to "II" position for the next examination; thereby completing the inspection of the operation of the steering lock system 11.

If an abnormality is detected in the process of the inspection of the operation of the steering lock system 11 using the above-described inspection device, then the examining operation of the steeling locking device 11 is stopped halfway, and the retaining of the key 14 by the key chuck means 72 is released. Thereafter, the movable table 70 is retracted away from the steering lock system 11 to the original position. In this state, the steering lock system 11 is still retained by the retaining means 66, but a warning sound or the like corresponding to the detected abnormality urges the operator to conduct the resetting operation for releasing the retaining of the steering lock system 11 by the retaining means 66. Thus, it becomes possible for the operator to remove the steering lock system 11 from the receiving member 79 of the support table 65. Moreover, the details of the abnormality detected in the process of the inspection of the operation are displayed on a control board which is not shown, whereby the operator can confirm the details of the abnormality of the steering lock system 11 which has been removed, while referring to the display.

The operation of the present embodiment will be described below. The inspection device for inspecting the operational state of the steering lock system 11 includes at least: the ignition switch 18; and the locking mechanism 19 capable of inhibiting the turning of the steering shaft 50. The inspection device further includes: the stationary support table 65; the retaining means 66 mounted on the support table 65 to be capable of releasably retaining the steering device 11 at the predetermined position; the switch signal checking means 67 disposed on the support table to be capable of checking the signal output from the ignition switch 18; the locking operation examining means 68 disposed on the support table 65 to be capable of examining the operational state of the locking mechanism 19 in a state in which the steering lock system 11 is retained by the retaining means 66; the movable table 70 capable of moving toward and away from the steering lock system 11 retained by the retaining means 66 in the direction along the axis of the rotor 15, the turnable shaft support means 72 mounted on the movable table 70 and rotatably carrying the turnable shaft 71 having the axis extending in the direction of movement of the movable table 70; the key chuck means 73 mounted at the tip end of the turnable shaft 71 in such a manner that the key can be releasably retained thereon; and the driving means 74 mounted on the movable table 70 to turnably drive the turnable shaft 71.

Therefore, in a state in which the steering lock system 11 after completion of the assembling thereof is retained at the predetermined position by the retaining means 66 on the support table 65, the movable table 70 is moved toward the support table 65; the key 14 inserted into the keyhole 24 is retained by the key chuck means 73; and the turnable shaft 71 having the key chuck means 73 at its tip end is turned by the driving means 74; thereby turning the rotor 15 of the steering lock system 11. By examining the change in the switching mode of the ignition switch 18 corresponding to the turning of the rotor 15 by the switch signal checking means 67 and examining the operational state of the locking mechanism 19 by the locking operation examining means 68, the inspection can be conducted continuously and automatically on the operation of at least the ignition switch 18 and the locking mechanism 19 of the steering lock system 11, so that the inspection of the operation of the steering lock system 11 can be carried out reliably and with a good accuracy even by only one operator.

As a result, in the inspection of the operation of the steering lock system 11, the number of operating steps can be reduced; and moreover an operating space can be reduced, as compared with the conventional case where the inspection is conducted by operators using jigs respectively on the operating portions in separate steps.

In such a case where the steering lock system 11 includes the interlocking mechanism 20 for inhibiting the turning of the rotor 15 from the ACC position to the LOCK position in response to the operation of the solenoid 38 which is adapted to be brought into an energized state at any shift position other than the parking position, the inspection device includes the energization control means 69 disposed on the support table 65 so as to control the energized state of the solenoid 38. Therefore, also the inspection of the operation of the interlocking mechanism 20 can be conducted continuously and automatically in combination with the inspection of the operation of the ignition switch 18 and the locking mechanism 19, leading to a further reduction in the number of the operating steps.

Although the embodiment of the present invention has been described in detail, the present invention is not limited to the above-described embodiment, and various modifications in design maybe made without departing from the subject matter of the invention defined in the claims.

What is claimed is:

1. A steering lock system inspection device for inspecting an operational state of a steering lock system which includes at least: an ignition switch which changes a switching mode in response to turning of a rotor adapted to be turned to pass sequentially through a LOCK position, an ACC position, an ON position and a START position in response to turning operation of a key inserted into a keyhole; and a locking mechanism which is switched over in response to turning of the rotor between a locking state for inhibiting turning of a steering shaft and an unlocking state for permitting the turning of the steering shaft, wherein the inspection device comprises:
a stationary support table;
a retaining means mounted on the support table to be capable of releasably retaining the steering lock system in a predetermined position;
a switch signal checking means disposed on the support table to be capable of checking a signal output from the ignition switch;
a locking operation examining means disposed on the support table to be capable of examining an operational state of the locking mechanism in a state in which the steering lock system is retained by the retaining means;
a movable table capable of moving toward and away from the steering lock system retained by the retaining means in a direction along an axis of the rotor;
a turnable shaft support means mounted on the movable table and rotatably carrying a turnable shaft having an axis extending in a direction of movement of the movable table;
a key chuck means mounted at a tip end of the turnable shaft so as to releasably retain the key thereon; and
a driving means mounted on the movable table to turnably drive the turnable shaft.

2. A steering lock system inspection device according to claim 1, further comprising an energization control means disposed on the support table so as to control an energized state of a solenoid adapted to be energized at any shift position other than a parking position, in order to examine operation of an interlocking mechanism which is mounted on the steering lock system so as to inhibit the turning of the rotor from the ACC position to the LOCK position in response to the operation of the solenoid.

* * * * *